Jan. 29, 1929.

T. J. FAY 1,700,566

VEHICLE SUSPENSION DEVICE

Original Filed Dec. 5, 1925

Inventor
Thomas J. Fay
By his Attorney
Victor D. Borst

Patented Jan. 29, 1929.

1,700,566

UNITED STATES PATENT OFFICE.

THOMAS J. FAY, OF BROOKLYN, NEW YORK.

VEHICLE SUSPENSION DEVICE.

Original application filed December 5, 1925, Serial No. 73,397. Divided and this application filed April 5, 1927. Serial No. 181,107.

This invention relates to vehicles and particularly to the control of the relative movements between the chassis frame and axle and is a division of my co-pending application, Serial No. 73,397, filed December 5, 1925, patented June 7, 1927, Patent No. 1,631,803, for "vehicles". Various attempts have been made to control such movements, but prior devices of other inventors have been unsatisfactory, in that if made effective in their control, they so restricted such movements that a vehicle, so equipped, was not easy riding. Such prior devices, however effective they may be, fall short of obtaining the most desirable results owing to the fact that they restrict the desirable relative motion between the chassis frame and axle and abruptly snub such action as well as controlling the undesirable motion. In other of such devices complex or delicate mechanisms have been required and were difficult to adapt or apply to existing designs of vehicles and involved material and expensive changes therein. An ideal vehicle is one in which a spring suspension is sensitive sufficiently to absorb the minor shocks, and which will also prevent bouncing and excessive and sudden relative movements of the chassis frame and axle in traveling over relatively rough roadways.

An object of this invention is to provide an improved vehicle construction with which all of the advantages of the usual spring suspension may be obtained, and the maximum of riding comfort obtained; with which the relative movements of the frame and axle will be effectively controlled and sudden and violent movements of the chassis frame prevented in a simple and effective manner; which will require a minimum of change in existing designs of vehicles; in accordance with which existing vehicles may be equipped for this control in a simple and rapid manner; and which may utilize effectively the usual spare tire or wheel without limiting its usefulness as a reserve tire or wheel in case of punctures or tire trouble; and which will be relatively simple, effective, and inexpensive.

Various other objects and advantages will be apparent from the following description of several embodiments of this invention, and the novel features will be particularly pointed out hereinafter in connection with the appended claims.

In the accompanying drawing:—

Figure 1:
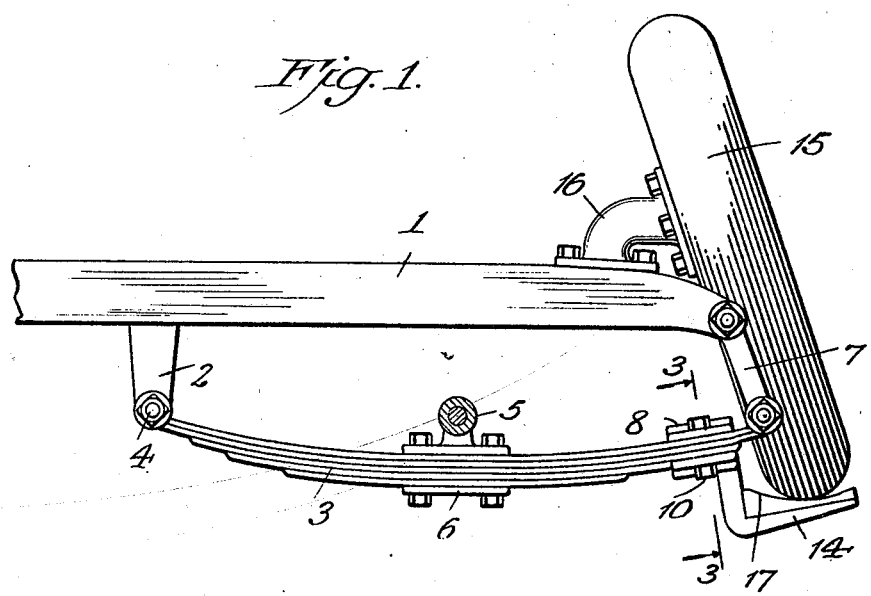
Fig. 1 is a side sectional elevation of a vehicle constructed in accordance with this invention, and illustrating one embodiment of the invention.
Figure 2:
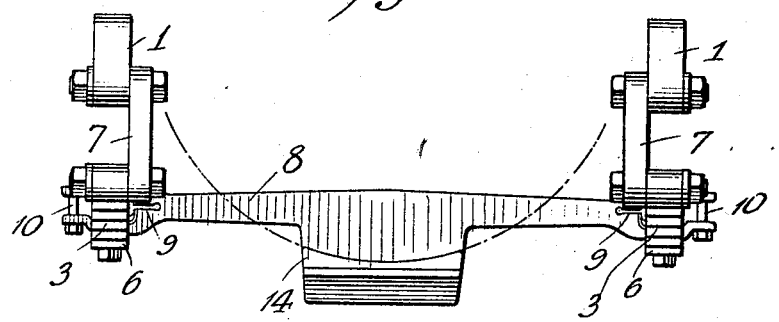
Fig. 2 is a rear elevation of the same.
Figure 3:
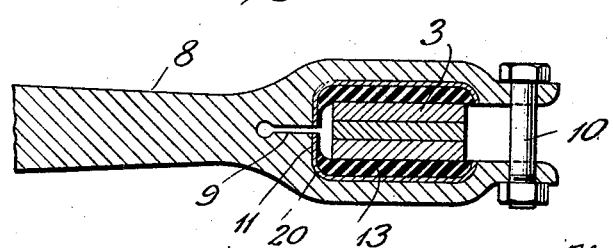
Fig. 3 is a sectional elevation of a portion of the embodiment shown in Figures 1 and 2, with the section taken approximately on line 3—3 of Figure 1.

In my co-pending application above referred to, I have described an embodiment of this invention, which necessitates a slight change in the spring suspension device, such as is usually employed in the usual automotive construction. In the embodiment to be shown and described in this application, the same purposes and objects are accomplished by a device which does not necessitate any change in the usual or standard construction of the spring suspension device.

Referring to the drawings, the chassis frame 1 is provided with a depending bracket 2 at each side. A spring element 3 is disposed at each side of the vehicle, and each at end is pivotally connected by a pin 4 to the corresponding bracket 2. Each element 3 is also connected at a point intermediate of its length to the axle 5 in the usual manner, such as by the clamping device 6.

The usual shackle elements 7 connect the other ends of the spring elements 3 to the frame 1. A bar 8 is connected between and adjacent corresponding ends of the spring elements 3 being secured thereto in a suitable manner, such as by clamping. Preferably the ends of the bar 8 are slit as at 9 so as to embrace the elements 3 and project beyond the same, the projecting arms of each end being connected by a suitable clamping bolt 10.

The inner faces of the slit portion 9 of the bar 8 are preferably hollowed out or recessed as at 11, and lined with a suitable material 12 such as a composition that will adhere well to metal. Such compositions are well known in the art and therefore do not require specific description. The depressions are then filled with soft rubber or a rubber composition 13, which is then vulcanized, all prior to the application of the bar to the spring element 3. The bar 8 is therefore resiliently clamped to the spring elements 3, through the rubber 13. Asbestos, brake lining fabric, wood, or other non-metallic facings may be substituted for the rubber or the composition 13, or the bar 8 may be clamped directly upon the spring.

A foot plate 14 depends from the bar 8 intermediate of its ends, and extends beneath an inflated spare pneumatic tire 15, which is carried by a bracket 16 which is in turn mounted upon the frame 1. The foot plate 14 preferably has an abutment surface 17, inclined to or oblique to its direction of movement relative to the tire, so as to have a somewhat wedgelike movement against the tire upon relative movement of the frame and axle. It is to be noted that the abutment surface 17 is normally in close proximity to and preferably in contact with the tire 15, so as to engage with the tire to a greater degree on the slightest relative movement of the tire of the chassis and axle. Whenever the frame and axle approach one another or separate, the bar 8 and its attached abutment surface 17 will be swung in a direction forwardly and rearwardly of the vehicle to a limited extent depending upon the extent of relative movement between the frame and axle, and during said relative movement, the surface plate 17 will engage with the tire. The tire, therefore, resists such movement and has a very effective control upon the action of the spring element 3.

Preferably the abutment surface 17 which contacts with the tire 15 is inclined to its direction of motion, that is, its motion during relative movement of the frame and axle, is such so as to be wedged more or less beneath the tire during such movements. It has been found that this wedge-like action is particularly effective in controlling and smoothing out such movements without sudden or violent shocks or jars to the occupants of the vehicle.

Vehicles constructed in accordance with this invention have been found to ride very smoothly at all speeds, regardless of the character of the roadways over which they travel, and when traveling over rough roadways with abrupt ridges or depressions therein, no violent or sudden movements of the frame occur.

It will be obvious that various changes in the details, which have been herein described and illustrated for the purpose of explaining the nature of the invention, may be made by those skilled in the art within the principle and scope of the invention as expressed in the appended claims.

I claim:—

1. In a vehicle, a chassis frame, an axle, a suspension device between said frame and axle, a spare pneumatic tire removably carried by the frame, and means connected to the suspension device and having an abutment surface engaging with said tire, whereby said tire will resist relative movement of said frame and axle, said means including a member having an abutment surface of such inclination to the tire and its movement relative thereto that upon relative movement of said frame and axle the abutment surface will engage the tire obliquely to its plane.

2. In a vehicle, a chassis frame and axle, a suspension element at each side of the vehicle connecting the axle and frame, a pneumatic tire carried by the frame between said suspension elements, and an abutment member extending between and connected to the outer end portions of the suspension elements and engaging with the tire, so that relative movements of the frame and axle will be resisted by said tire as well as by said suspension elements.

3. In a vehicle, a chassis frame and axle, a suspension element at each side of the vehicle, connected at one end to the frame, at an intermediate point to the axle, and at its other end by a swinging link to the frame, a pneumatic tire carried by the frame between said elements, and abutment means disposed adjacent the tire and connected directly to the suspension elements adjacent the link connections for movement into contact with the tire upon relative movements of said frame and axle.

4. In a vehicle, a chassis frame and axle, a suspension element at each side of the vehicle, connected at one end to the frame, at an intermediate point to the axle, and at its other end by a swinging link to the frame, a pneumatic tire carried by the frame between said suspension elements, and abutment means disposed adjacent the tire and connected to the suspension elements for movement into contact with the tire upon relative movement of said frame and axle, said abutment device having a surface inclined to its direction of movement with the tire and engaged by the tire upon such relative movement.

5. In a vehicle, a chassis frame, an axle, a suspension element at each side of the frame, connected at one end to the frame, at an intermediate point of its length to the axle, and by a link connection between the other end of each suspension element and the frame, a bar having clamping jaws secured to the last named ends of said suspension elements and extending between the same, a pneumatic tire carried by the frame and engaging with said bar, whereby said tire and bar will resiliently oppose relative movement of said frame and axle.

6. In a vehicle a chassis frame, an axle, a suspension device between said frame and axle, a spare pneumatic tire removably carried by the frame, and means resiliently connected to the suspension device and having an abutment surface engaging with said tire, whereby said tire will resist relative movement of said frame and axle, said means including a member having an abutment surface of such inclination to the tire and its movement relative thereto that upon relative movement of said frame and axle the abutment surface will engage the tire obliquely to its plane.

7. In a vehicle, a chassis frame, an axle, a suspension element at each side of the frame, connected at one end to the frame, at an intermediate point of its length to the axle, and by a link connection between the other end of each suspension element and the frame, a bar having clamping jaws resiliently secured to the last named ends of said suspension elements and extending between the same, a pneumatic tire carried by the frame and engaging with said bar, whereby said tire and bar will resiliently oppose relative movement of said frame and axle.

8. In a vehicle, a chassis frame, an axle, a suspension element at each side of the frame, connected at one end to the frame, at an intermediate point of its length to the axle, and by link connection between the other end of each suspension element and the frame, a bar having clamping jaws, said jaws being lined with a resilient material and adapted to be secured to the last named ends of said suspension elements and extending between the same, a pneumatic tire carried by the frame and engaging with said bar whereby said tire and bar will resiliently oppose relative movement of said frame and axle.

In witness whereof, I hereunto subscribe my signature.

THOMAS J. FAY.